Oct. 6, 1964 P. J. RICHARTZ 3,152,230
CENTRIFUGAL GOVERNOR SWITCH
Filed Oct. 6, 1960 2 Sheets-Sheet 1

INVENTOR.
Paul J. Richartz
BY
Robert F. Miehle
Atty.

Oct. 6, 1964   P. J. RICHARTZ   3,152,230
CENTRIFUGAL GOVERNOR SWITCH
Filed Oct. 6, 1960   2 Sheets-Sheet 2
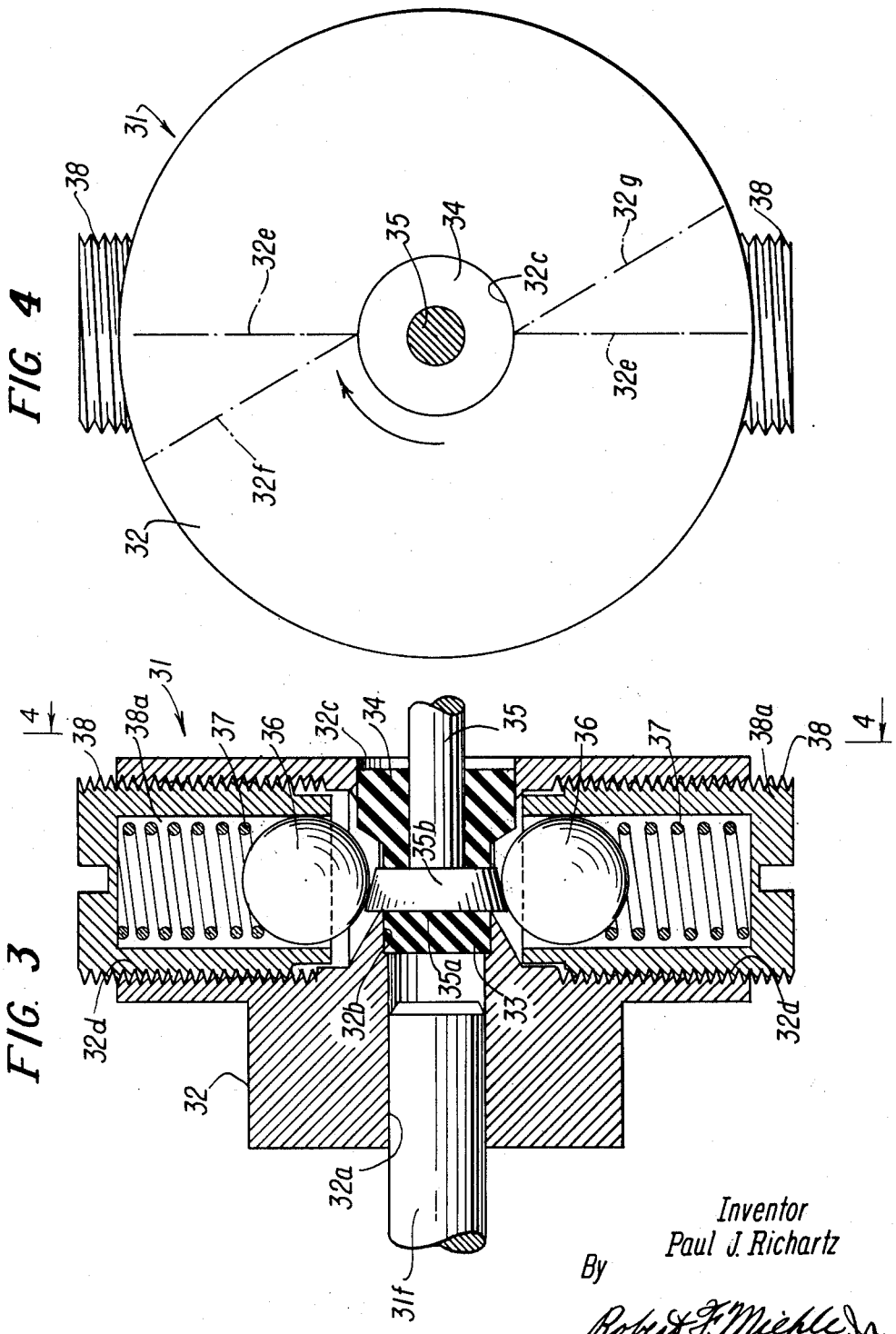
Inventor
Paul J. Richartz
By
Robert F. Miehle, Jr.
Atty.

United States Patent Office 3,152,230
Patented Oct. 6, 1964

3,152,230
CENTRIFUGAL GOVERNOR SWITCH
Paul J. Richartz, Lincolnwood, Ill., assignor to Bell & Howell Company, Chicago, Ill., a corporation of Illinois
Filed Oct. 6, 1960, Ser. No. 60,859
7 Claims. (Cl. 200—80)

This invention relates to a motor governor, and more particularly to a governor for a camera drive motor.

An object of the invention is to provide a new and improved motor governor.

Another object of the invention is to provide a governor for an electric motor drive of a motion picture camera.

Another object of the invention is to provide a centrifugal governor for an electric motor wherein the contact making and breaking portions are continuously changed to reduce the effect of pitting.

A complete understanding of the invention may be obtained from the following detailed description of a motor governor forming a specific embodiment thereof, when read in conjunction with the appended drawings, in which:

FIG. 3 is an enlarged, fragmentary vertical sectional view taken along line 3—3 of FIG. 1; and FIG. 4 is an enlarged vertical sectional view taken along line 4—4 of FIG. 3.

Figure 1:
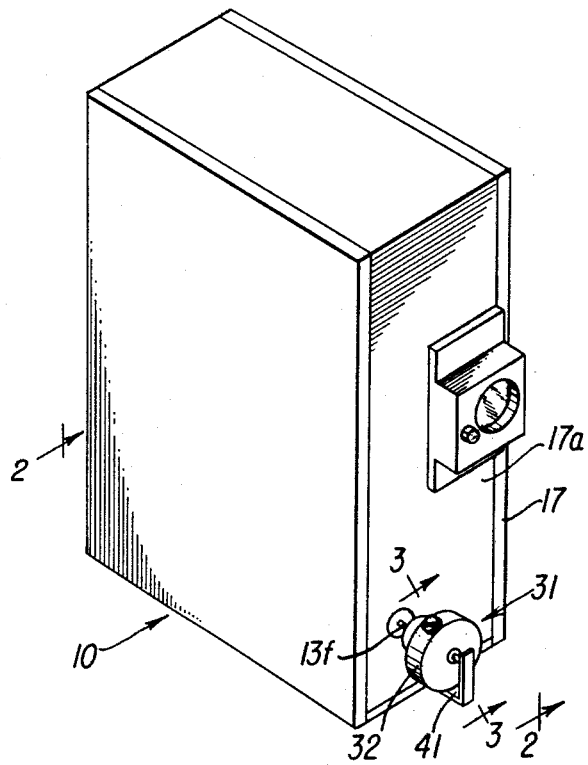
FIG. 1 is a perspective view of a mechanism of a motion picture camera including a motor governor forming one embodiment of the invention.

The invention provides a motor governor for an electrically driven motion picture camera in which an electro-conductive housing is keyed to one end of an armature shaft of a D.C. motor, and electro-conductive balls are urged radially inwardly in the housing against an axially mounted contact member carried with and insulated from the housing. The contact member engages a stationary spring contact connected to one side of a D.C. power source. The armature shaft is connected electrically to ground as is one brush of a commutator. The other brush of the commutator is connected to the other side of the power source to complete the circuit through the armature winding. When the armature exceeds the desired speed, the balls are moved centrifugally to break contact with the contact member and the motor slows down. Preferably a resistor and a capacitor are connected in shunt with the governor, the resistor causing the governor to only reduce the power to the armature rather than cut off the power completely and the capacitor serving to eliminate arcing of governor.

Referring now in detail to the drawings, there is shown therein a camera mechanism 10 designed to fit in a camera casing carrying a lens. The camera mechanism includes a D.C. electric motor 11 which has a permanent magnet field or stator 12 of electro-conductive as well as magnetic material. The motor also has an armature 13 provided with insulated windings 13a connected to commutator segments 13b in a manner well known in the art. Commutator brushes 13c and 13d also of known construction contact the segments 13b to provide the proper currents and directions through the windings 13a to rotate the armature. The armature has a shaft 13e of steel or other strong electro-conductive metal, and the shaft is journaled in bearings 14 and 15 supported in a known manner by rigid plates 16 and 17a. The shaft has gears 18 and 19 keyed thereto for driving camera gear trains 20 and 21 in a manner well known in the art. Insulating brushes holders 22 of known construction also are provided. A casing 17 supports the motor rigidly thereon.

A centrifugal governor 31 has a body member 32 of steel or other electro-conductive material keyed by a drive fit or other suitable keying means to end portion 13f of the shaft 13e which fits drivingly into bore 32a (FIG. 3). A thick disc 33 of electrical insulation seats in a counterbore 32b in the member 32 and projects therefrom into a larger counterbore 32c. A spacer bushing or grommet 34 fits tightly in the counterbore 32c to bracket head 35a of electro-conductive contact member 35 with the disc 33. Preferably the bushing 34 and disc 33 permit rotation of the member 35. Electro-conductive balls 36 are urged inwardly by electro-conductive springs 37 against frustoconical periphery 35b of the head of the contact member. The balls 36 and springs 37 are mounted in bores 38a in slotted adjustable guides 38 threaded adjustably in radial tapped bores 32d. While the bores 32d in the embodiment shown and described are radial of the member 32 and shaft 13e and extending along radii 32e (FIG. 4), the bores 32d may extend along centerlines 32f and 32g which are chordal relative to the member 32 so that, as the balls move by centrifugal action along the bores 38a, the balls roll to present different portions of the balls to the contact member 35. The tapered surface 35b also causes rolling of the balls 36, the bores 38a being of substantially larger diameter than the balls 36 to permit limited movement of the balls 36 laterally of the bores 38a. The surface 35b and the external surfaces of the balls are plated with platinum and ruthenium to provide hardness and avoid pitting and oxidation, the proportions of the platinum and ruthenium being 96% platinum and 4% ruthenium. The contact member 35 tends to lag behind the rotation of the body member and to roll the balls 36.

Figure 2:
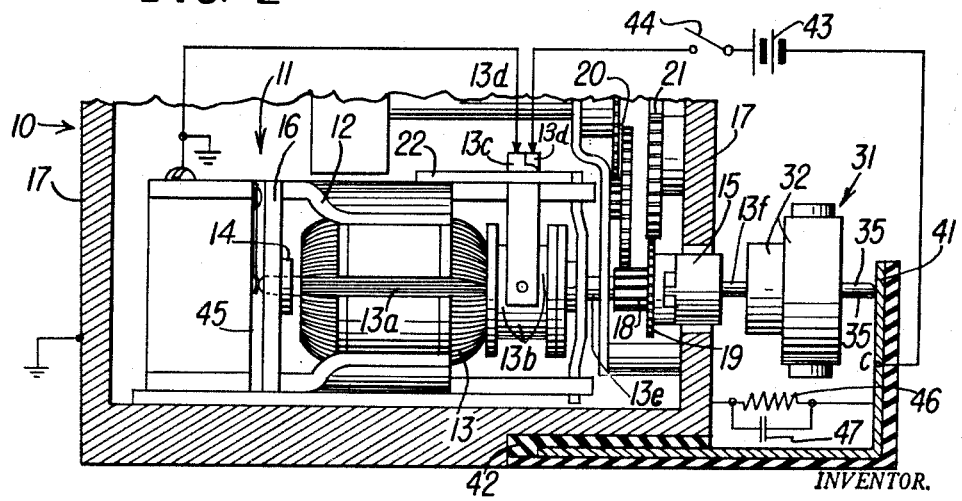
FIG. 2 is an enlarged, fragmentary vertical sectional view taken along line 2—2 of FIG. 1.

A contact spring 41 (FIGS. 1 and 2) bears against rounded end of rod 35c of the contact 35 to give a slip ring type of connection. The spring 41 is secured in insulator 42 fixed to the casing 17 and the spring 41 is connected electrically to one terminal of battery 43. The other side of the battery is connected through a manually operable switch 44 to the brush 13d. The brush 13c is connected to ground and the armature shaft 13e through the permanent magnet field or stator 12 and a spring plate 45 of electro-conductive material engaging rounded end of shaft 13e to provide a slip ring connection therewith. A resistor 46 and a capacitor 47 in parallel therewith are connected between the contact spring 41 and ground.

In operation, current is supplied continuously to the armature windings 13a from ground through the spring 41, the battery 43, switch 44 and the brush 13d on the one side and from ground and the brush 13c on the other side. The resistor 46 limits the current through this path to an extent such that, from this current only, the motor will not run at as high a speed as desired. However, whenever the motor is below the desired speed, the balls 36 contact the contact member 35 to shunt the resistor 46, the contact 41 then being connected to ground through the low resistance path of the contact member 35, the balls 36, springs 37 and guides 38, the member 32, shaft 13e, contact 45 and stator 12. This causes the motor to tend to run at a slightly higher speed than desired and as the desired speed is exceeded, the balls 36 move from centrifugal force out of contact with the contact member 35 to break the low resistance path shunting resistor 46 and reduce the current to the armature. The motor then slows to slightly less than the desired speed and the balls 36 recontact the contact member 35. The effect of the resistor 46 is to reduce hunting and that of the capacitor 47 is to eliminate arcing between the balls 36 and contact member 35.

The governor 31 is a unitary assembly except for the simple slip ring contact 41 and may be assembled very quickly on existing D.C. motors.

While the invention is thus described, it is not wished to be limited to the precise details described, as changes may be readily made without departing from the spirit of the invention.

What is claimed is:

1. In a governor for an electric motor including an electro-conductive armature shaft, a body member of electro-conductive material designed to be keyed to the shaft and having a bore fitting on the shaft and a counterbore extending beyond the end of the shaft, the body member also having a tapped bore extending transversely of the counterbore from the periphery of the member to the counterbore, an exteriorly threaded hollow guide of electro-conductive material adjustably mounted in the tapped bore, an electro-conductive ball slidable in the guide, an electro-conductive spring in the guide and urging the ball inwardly relative to the member, a contact member, and insulating means mounting the contact member in the counterbore in position to be contacted by the ball and electrically insulated from the body member.

2. The governor of claim 1 wherein the contact member includes a head portion and rod portion extending therefrom, and a stationary contact for engaging the end of the rod portion to provide therewith a slip ring connection.

3. In a governor for an electric motor having an electro-conductive armature shaft having a free end, a generally cylindrical body member of electro-conductive material having an axial bore adapted to fit on the free end of the shaft and be fixed thereto, the body member also being provided with a first counterbore extending from the shaft and a second counterbore extending from the first counterbore, the body member also having a tapped lateral bore extending from the counterbores to the periphery of the body member, a disc of insulating material fitting in the first counterbore, a contact member having a rod portion and a head portion engaging the disc, a bushing-like insulator fitting in the second counterbore and holding the head portion of the contact member against the disc, an exteriorly threaded hollow guide threaded into the tapped lateral bore, a compression spring in the guide, and a ball of electro-conductive material movable in the guide and urged by the spring against the head of the contact member.

4. The governor of claim 3 wherein the portion of the head portion contacted by the ball is sloping and the ball fits loosely in the hollow guide so that the ball rolls along the head portion when urged into and out of engagement with the head portion.

5. The governor of claim 3 wherein the ball and the contact member have surfaces of platinum and ruthenium, the platinum and ruthenium proportions being about 96% platinum and 4% ruthenium.

6. In a governor, a generally cylindrical body member of electro-conductive material having an axial bore adapted at one end to fit over an end of a shaft, the body member having a pair of aligned radial bores threaded interiorly and extending from the periphery of the body member to the axial bore, a contact member in the bore having a head in lateral alignment with the radial bores and a rod portion extending axially from the head away from the end of the shaft, insulating means mounting the contact member in the axial bore, a pair of exteriorly threaded hollow guides adjustably threaded into the radial bores, a pair of electro-conductive balls in the guides, and compression springs in the guides urging the balls toward the head of the contact member.

7. The governor of claim 6 in which the contact member is rotatable in the body member.

References Cited in the file of this patent

UNITED STATES PATENTS

| | | |
|---|---|---|
| 1,558,487 | Krauss | Oct. 27, 1925 |
| 2,804,515 | Heggen | Aug. 27, 1957 |
| 2,845,505 | Jury | July 29, 1958 |
| 2,931,870 | Krulik | Apr. 5, 1960 |